US012762146B2

(12) United States Patent
Khurana et al.

(10) Patent No.: US 12,762,146 B2
(45) Date of Patent: *Oct. 13, 2026

(54) DATA RETRIEVAL USING DISTRIBUTED WORKERS IN A LARGE-SCALE DATA ACCESS SYSTEM

(71) Applicant: Databricks, Inc., San Francisco, CA (US)

(72) Inventors: Amandeep Khurana, San Francisco, CA (US); Nong Li, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 18/771,892

(22) Filed: Jul. 12, 2024

(65) Prior Publication Data

US 2025/0005038 A1 Jan. 2, 2025

Related U.S. Application Data

(63) Continuation of application No. 17/026,772, filed on Sep. 21, 2020, now Pat. No. 12,050,619.

(Continued)

(51) Int. Cl.
*G06F 16/27* (2019.01)
*G06F 9/54* (2006.01)

(Continued)

(52) U.S. Cl.
CPC .............. *G06F 16/27* (2019.01); *G06F 9/547* (2013.01); *G06F 16/2455* (2019.01); *G06F 16/252* (2019.01); *G06F 16/284* (2019.01)

(58) Field of Classification Search
CPC .... G06F 16/27; G06F 16/284; G06F 16/2455; G06F 16/252; G06F 9/547

(Continued)

(56) References Cited

U.S. PATENT DOCUMENTS 6,389,421 B1 * 5/2002 Hawkins ............... G06F 9/4881
7,725,605 B2 * 5/2010 Palmeri ................. G06F 16/256
709/201

(Continued)

OTHER PUBLICATIONS

United States Office Action, U.S. Appl. No. 17/026,772, Jun. 9, 2022, 15 pages.

(Continued)

*Primary Examiner* — Hanh B Thai
(74) *Attorney, Agent, or Firm* — Fenwick & West LLP

(57) ABSTRACT

Disclosed herein provides enhancements for operating a data access application service executing on a data access server system and an external computing system. In the data access server system, a request is received from a client device executing at least one of multiple application services for a dataset from one or more of multiple storage systems. In the data access server system, a data retrieval instruction is generated for the client device to access the dataset from the one or more of the multiple storage systems. The data retrieval instruction comprises task descriptions and a temporary credential. The data retrieval instruction is transferred to the external computing system via the client device and the requested dataset is retrieved and deployed based on the task descriptions and the temporary credential from the one or more of the multiple storage systems.

20 Claims, 6 Drawing Sheets

Related U.S. Application Data

(60) Provisional application No. 62/902,681, filed on Sep. 19, 2019.

(51) Int. Cl.
*G06F 16/2455* (2019.01)
*G06F 16/25* (2019.01)
*G06F 16/28* (2019.01)

(58) Field of Classification Search
USPC .......................................................... 707/770
See application file for complete search history.

(56) References Cited

U.S. PATENT DOCUMENTS 8,676,622 B1 * 3/2014 Ward, Jr. ......... G06Q 10/06313 705/7.11
9,246,921 B1 * 1/2016 Vlaminck ............... H04L 63/10
9,489,401 B1 * 11/2016 Garcia ................ G06F 16/5838
10,469,484 B1 * 11/2019 Chen ................... H04L 63/0853
10,585,951 B2 * 3/2020 Bhattacharjee ....... G06F 16/904
10,592,563 B2 * 3/2020 Pal ........................ G06F 16/248
10,698,897 B2 * 6/2020 Bhattacharjee ....... G06F 16/951
10,824,474 B1 * 11/2020 Kamboj ................ G06F 9/5038
11,126,632 B2 * 9/2021 Pal ...................... G06F 16/2471
11,232,100 B2 * 1/2022 Bhattacharjee ..... G06F 16/2272
11,314,753 B2 * 4/2022 Pal ........................ G06F 16/211
11,431,729 B2 * 8/2022 Bloomquist ........ G06F 21/6245
11,432,149 B1 * 8/2022 Dhanoa ................... H04W 4/80
11,580,107 B2 * 2/2023 Pal ........................ G06F 9/5077
11,615,104 B2 * 3/2023 Pal ........................ G06F 16/211 707/722
12,361,000 B1 * 7/2025 Chen ................. G06F 16/24542
2003/0093409 A1 * 5/2003 Weil .................... G06F 16/9535
2006/0031225 A1 * 2/2006 Palmeri .................. G06Q 10/06
2006/0277220 A1 * 12/2006 Patrick ................ G06F 21/6227
2007/0073572 A1 * 3/2007 McLaughlin .......... G06Q 10/06 705/7.23
2010/0268902 A1 * 10/2010 Drobychev ........... G06F 16/273 711/E12.002
2011/0314071 A1 * 12/2011 Johnson .................. G06F 16/13 707/827
2013/0339254 A1 * 12/2013 Figlin .................... G06Q 10/06 705/301
2014/0012876 A1 * 1/2014 Beskrovny .............. H04L 67/51 707/770
2014/0278623 A1 * 9/2014 Martinez ................ G06Q 10/06 705/7.12
2014/0298358 A1 * 10/2014 Tian ................... G06Q 10/1093 719/318
2015/0006627 A1 * 1/2015 Palmeri ................... H04L 67/10 709/203
2015/0134626 A1 * 5/2015 Theimer ............. G06F 11/3055 707/693
2015/0178007 A1 * 6/2015 Moisa ................. H04L 67/1097 713/190
2015/0281966 A1 * 10/2015 Griot ..................... H04W 12/06 726/5
2016/0086108 A1 * 3/2016 Abelow ................. G06Q 30/02 705/7.29
2016/0191614 A1 * 6/2016 Palmeri ............... G06F 3/04842 709/203
2017/0359157 A1 * 12/2017 Kemmer ............... H04L 5/0032
2017/0374151 A1 * 12/2017 Moorthi .............. H04L 67/5681
2018/0089278 A1 * 3/2018 Bhattacharjee ..... H04L 67/1097
2018/0150397 A1 * 5/2018 Gupta ................. G06F 12/0813
2018/0165072 A1 * 6/2018 Fink .......................... G06F 8/22
2018/0189328 A1 * 7/2018 Frazier ..................... G06F 16/25
2019/0018856 A1 * 1/2019 Khurana ............... G06F 16/144
2019/0138640 A1 * 5/2019 Pal ...................... G06F 16/2471
2019/0138641 A1 * 5/2019 Pal .......................... G06F 16/27
2019/0138642 A1 * 5/2019 Pal ...................... G06F 16/2471
2019/0147086 A1 * 5/2019 Pal ...................... G06F 16/1734 707/718
2019/0163841 A1 * 5/2019 Bhattacharjee ....... G06F 16/212
2019/0171678 A1 * 6/2019 Pal ........................ G06F 16/212
2019/0272271 A1 * 9/2019 Bhattacharjee ..... G06F 16/2471
2019/0310977 A1 * 10/2019 Pal ........................ G06F 9/5077
2020/0050586 A1 * 2/2020 Pal ........................ G06F 16/148
2020/0334045 A1 * 10/2020 Chaiken ................ G06F 21/575
2020/0348867 A1 * 11/2020 Chanler ................ G06F 3/0611
2022/0129467 A1 * 4/2022 Li ........................... G06F 16/27

OTHER PUBLICATIONS

United States Office Action, U.S. Appl. No. 17/026,772, Mar. 13, 2023, 17 pages.
United States Office Action, U.S. Appl. No. 17/026,772, Aug. 3, 2023, 14 pages.

* cited by examiner

DATA RETRIEVAL USING DISTRIBUTED WORKERS IN A LARGE-SCALE DATA ACCESS SYSTEM

RELATED APPLICATIONS

This application is a continuation of prior, co-pending U.S. application Ser. No. 17/026,772, filed Sep. 21, 2020, which hereby claims the benefit of and priority to U.S. Provisional Patent Application No. 62/902,681, titled "DATA RETRIEVAL USING DISTRIBUTED WORKERS IN A LARGE-SCALE DATA ACCESS SYSTEM," filed Sep. 19, 2019, and both of which are hereby incorporated by reference in their entirety for all purposes.

TECHNICAL FIELD

Aspects of the disclosure are related to computing hardware and software technology, and in particular to large-scale data access systems.

TECHNICAL BACKGROUND

An increasing number of data-intensive applications are being developed to serve various needs, such as processing very large data sets. Multiple storage services employed on clusters of computers are used to distribute various data. In addition to the multiple storage services, various large-scale processing applications have been developed to interact with the large-scale data sets and perform data management tasks, such as organizing and accessing the data and performing related operations with respect to the data.

To deploy the large-scale processing of data from multiple storage services in a computing environment, users are often required to individually configure the programs to operate on a specific application service. These individually configured programs operating on each of the application services are typically not operable on a different application service or must be manually rebuilt by an administrator to adapt to the new application service environment. This rebuilding of each of the application services can be time consuming and cumbersome as each application service may have different deployment parameters.

Large-scale processing of data also may require a large number of servers and machines to accommodate the amount of data requests incoming for data from the multitude of storage systems. Requiring a large number of servers with full storage access can be complicated and burdensome on the data access system. Additionally, each server may be vulnerable to being compromised which may provide unauthorized users access to secure data. Therefore, current techniques for enabling a user to accessing large-scale data sets from a variety of storage services is inefficient.

OVERVIEW

Disclosed herein provides enhancements for operating a data access application service executing on a data access server system and an external computing system. In the data access server system, a request is received from a client device executing at least one of multiple application services for a dataset from one or more of multiple storage systems. In the data access server system, a data retrieval instruction is generated for the client device to access the dataset from the one or more of the multiple storage systems. The data retrieval instruction comprises task descriptions and a temporary credential. The data retrieval instruction is transferred to the external computing system via the client device and the requested dataset is retrieved and deployed based on the task descriptions and the temporary credential from the one or more of the multiple storage systems.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
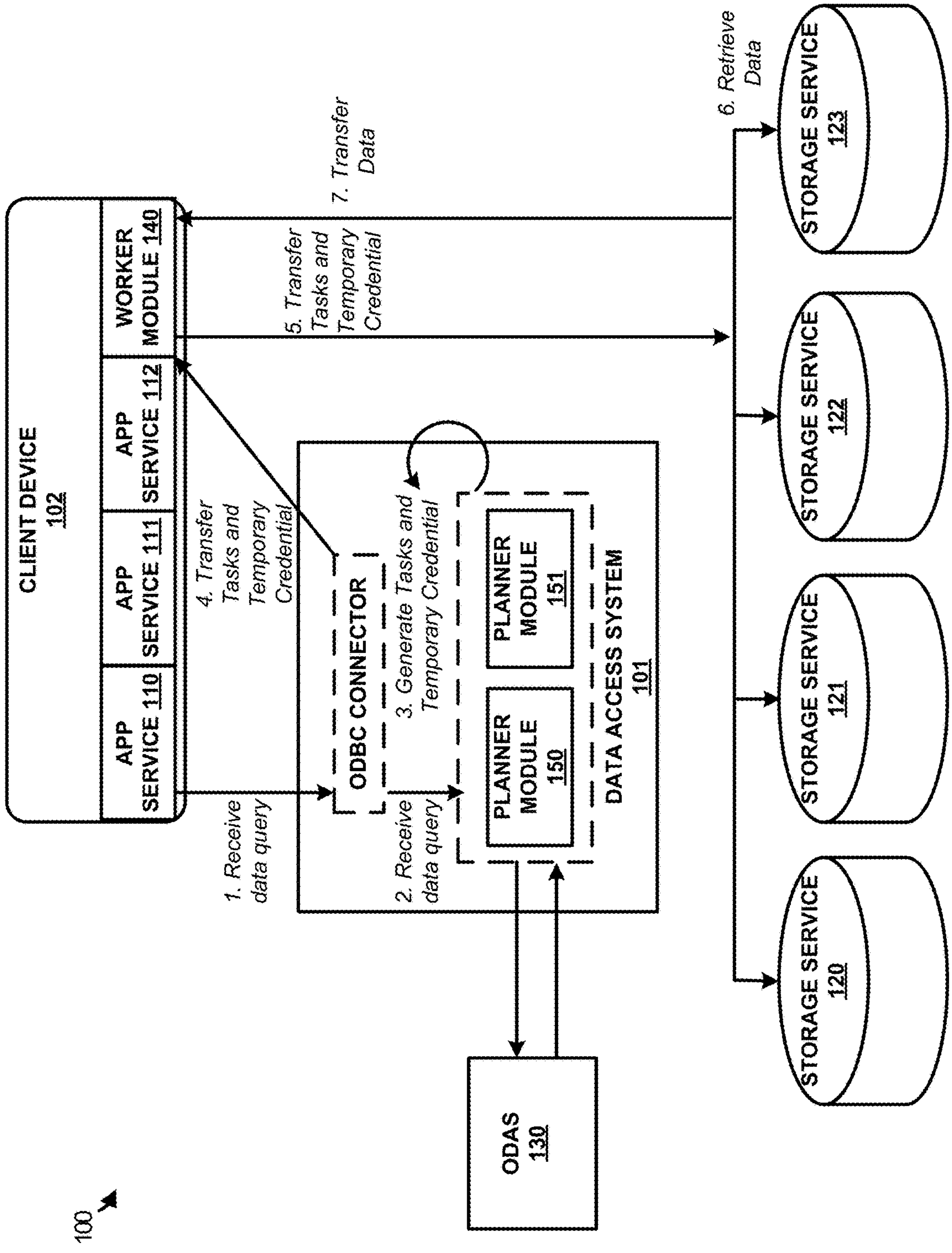
FIG. 1 illustrates a data access system for generating a data configuration in a multiple application service and multiple storage service environment according to one implementation.

Large data processing environments may employ a plurality of data access systems to provide efficient handling of data exchange between multiple application services and multiple storage services. Application services may include a variety of interactive computer applications for organization, analysis, and storages of data. These application services may include a distributed application, an Open Database Connectivity (ODBC) service, a Representational State Transfer (REST) service, or other similar types of application services capable of organizing and deploying data. For example, application services may include a spreadsheet service, a Spark service, a Python service, an electronic medical record service, and the like.

In addition to the application services, various storages services are made available that may store digital data on computer components, such as memory. Storage services may comprise a file system, a Relational Database Management System (RDBMS), or a data stream. For example, storage services may be a Hadoop Distributed File System (HDFS), a Simple Storage Service (S3), Kafka, Kinesis, DynamoDB, HBase, versions of the Google file system, or some other custom data store-including combinations thereof. The data may be stored and retrieved on the same physical computing systems or on separate physical computing systems and devices. Data storage and data sources may also be stored using object storage systems.

To retrieve data, application services may desire to query a variety of storage systems, such as by creating a workload job process. These workload job processes may include Hadoop processes, Spark processes, or other similar large data job processes to the host computing systems storing the data to be queried. In some implementations, the large data in the storage service may by stored on private serving computing systems, operating for a particular organization. However, in other implementations, in addition to or in place of the private serving computing systems, an organization may employ a cloud environment, such as Amazon Elastic Compute Cloud (Amazon EC2), Microsoft Azure, Rackspace cloud services, or some other cloud environment, which can provide on demand virtual computing resources to the organization. Within each of the virtual computing resources, or virtual machines, provided by the cloud environments, one or more virtual nodes may be instantiated that provide a platform for the large-scale data processing.

In the present implementation, to efficiently deploy the data from the storage services to the application services within the network, data access systems are created that include the runtime operations required for retrieving and processing the data within the environment. In particular, these data access systems may be responsible for providing an interface for gathering data from a specified storage system, displaying the data, enforcing security and authorization policies, or any other similar procedure for the data retrieval and display service. Further, in some examples, the data access systems may be responsible for organizing and managing the data based on their source storage service and destination application service within the processing environment.

To retrieve the data from the variety of storage systems, a large number of servers hosting worker modules may be required. These servers may utilize a majority of the resources in the data access system. For example, if a client device-to-worker server ratio is 10:1, then 500 clients would require 50 worker servers to execute the data requests. This can scale up quickly as more storage systems and client devices are integrated into the system. Implementations herein enable the data access system to utilize resources from external computing system (e.g., on the client device or an external server system) to carry out task descriptions generated by planner servers.

Furthermore, each server may act as a single point of access to all of the confidential data stored in the storage systems. Therefore, as more servers get added to the data access system, there is a greater likelihood of one or more of the servers being compromised. Therefore, the implementation system herein allows the data access system to maintain a secure line to data in the storage systems while not overly burdening its available resources by limiting authorization privileges to the planner servers and operating worker servers externally using a temporary credentialing process.

FIG. 1 illustrates a computing environment 100 to operate a data access system according to one implementation. Computing environment 100 includes data access system 101, client device 102 executing application services 110-112, and storage services 120-122. Data access system 101 is an example of a data access system described herein, and includes an ODBC connector and planner modules 150-151 execute on one or more physical computing systems. Client device 102 also includes worker module 140. This computing system may include desktop computing systems, server computing systems, or any other similar physical computing system capable of providing a platform for data access system 101.

In operation, data access system 101 receives a request from client device 102 executing at least one of multiple application services 110-112 for a dataset from one or more of multiple storage systems 120-123. Data access system 101 then generates a data retrieval instruction for client device 102 to access the dataset from one or more of the multiple storage systems 120-123. The data retrieval instruction comprises task descriptions and a temporary credential. The data retrieval instruction is transferred to worker module 140 executing on client device 102 and the requested dataset is retrieved and deployed based on the task descriptions and the temporary credential from one or more of the multiple storage systems 120-123.

Figure 2:
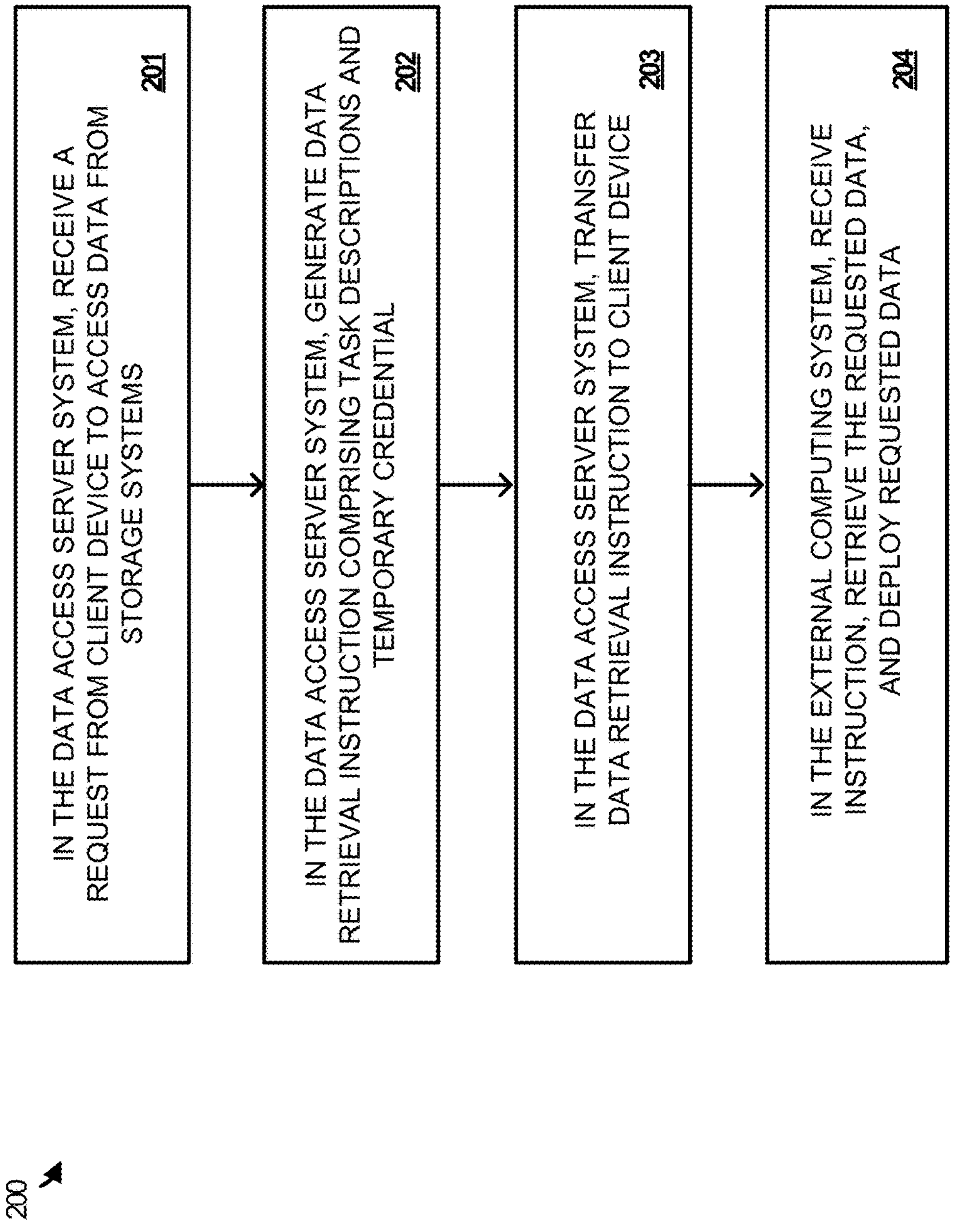
FIG. 2 illustrates an operational scenario of a data access system for generating a data configuration in a multiple application service and multiple storage service environments.

Referring now to FIG. 2, FIG. 2 illustrates an operational scenario 200 of operating a data access system. Operational scenario 200 includes systems and elements from computing environment 100 of FIG. 1.

As depicted, at step 1, data access system 101 receives a request from client device 102 executing at least one of multiple application services 110-112 for a dataset from one or more of multiple storage systems 120-123. Application services 110-111 may comprise a distributed application, an ODBC service, a REST service, or some other similar application service that may query various storage systems for data. For example, application services 110-111 may comprises a spreadsheet service, a Spark service, a Python service, an electronic medical record service, and the like.

In addition to receiving the data query, data access system 101, at step 2, generates a data retrieval instruction for client device 102 to access the dataset from one or more of the multiple storage systems 120-123. The data retrieval instruction comprises task descriptions and a temporary credential. The data retrieval instruction is transferred, at step 3, to worker module 140 executing on an external computing system. In some implementation, the worker module executing on the external computing system comprises the worker module executing on the client device. In other embodiments, the worker module executing on the external computing system comprises the worker module executing on an external server system.

In some embodiments, planner module 150 generates the data retrieval instruction for the client device to access the dataset from the one or more of the multiple storage systems 120-123 by authenticating the user for the data request and responsively determining the tasks descriptions and the temporary credential. The temporary credential may indicate a limited data type in the one or more of the multiple storage systems 120-123 accessible to the external computing system. The temporary credential may also indicate a limited duration of time from which the data in the one or more of the multiple storage systems 120-123 is accessible to the external computing system.

Once the data query has been received worker module 140, at step 4 and the requested dataset is retrieved and deployed based on the task descriptions and the temporary credential from one or more of the multiple storage systems 120-123. Storage services 120-122 may comprise a file system, an RDBMS, or a data stream. For example, storage services 120-122 may be a Hadoop Distributed File System (HDFS), a Simple Storage Service (S3), Kafka, Kinesis, DynamoDB, HBase, or some other custom data store. The data may be retrieved based on the tasks defined in the metadata of the data retrieval instruction. For example, the metadata may define which data application services 110-111 may receive data from storage services 120-122.

Figure 3:
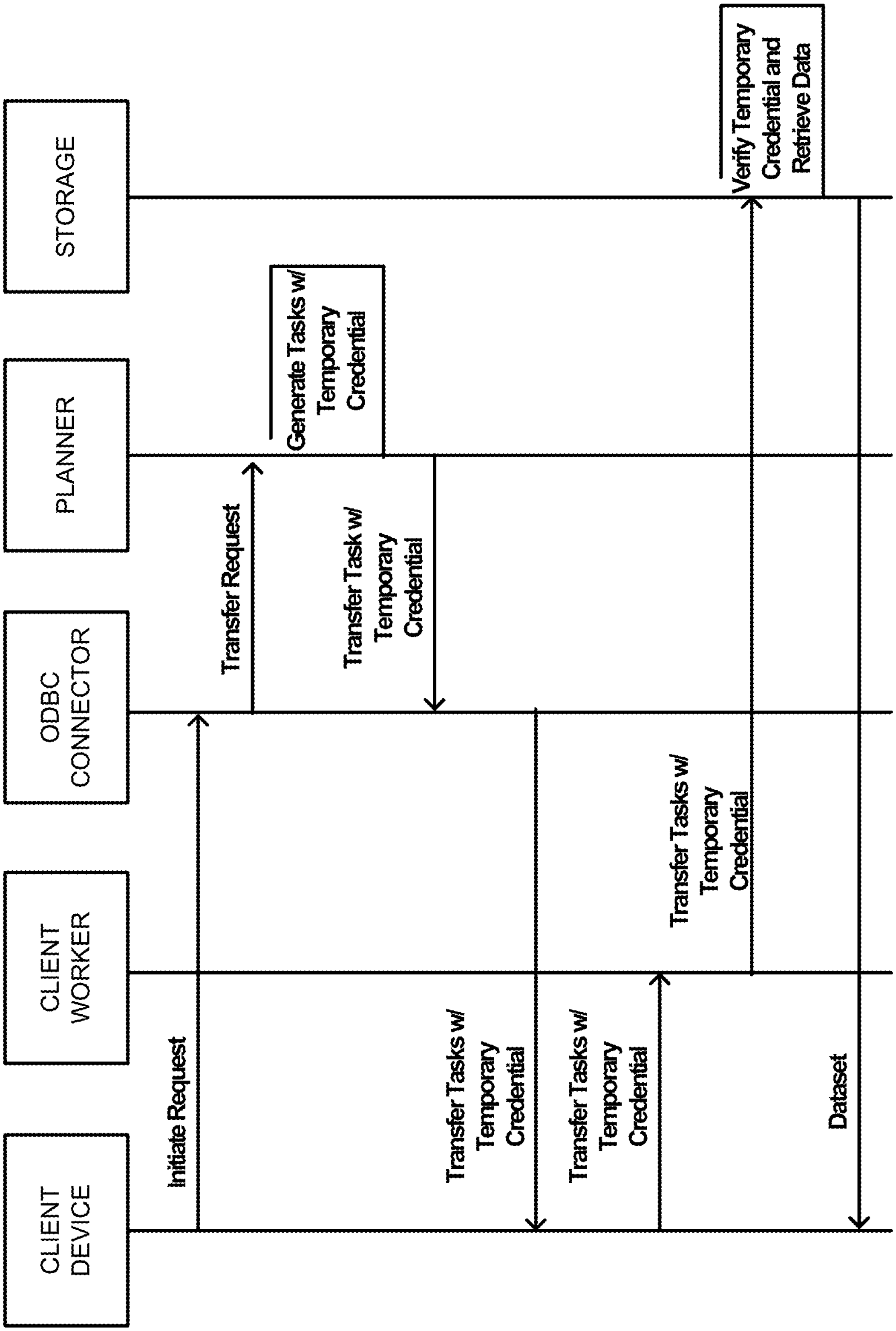
FIG. 3 illustrates a method of operating a metadata service for generating a data configuration in a multiple application service and multiple storage service environment according to one implementation.

To further demonstrate the operations of computing environment 100, FIG. 3 is provided. FIG. 3 illustrates a sequence diagram to implement data access system in a multiple application service and multiple storage service environment according to one implementation. The operations of FIG. 3 are described in the paragraphs that follow with reference to systems and objects of computing environment 100 from FIG. 1.

As illustrated in FIG. 3, the method begins with the ODBC connector in data access system 101 receiving a request from client device 102 executing at least one of multiple application services 110-112 for a dataset from one or more of multiple storage systems 120-123. Planner module 150 in data access system 101 then generates a data retrieval instruction for client device 102 to access the dataset from one or more of the multiple storage systems 120-123. The data retrieval instruction comprises task descriptions and a temporary credential. The data retrieval instruction is transferred from the ODBC connector to worker module 140 executing on client device 102. The requested dataset is retrieved from multiple storage systems 120-123 and deployed based on the task descriptions and the temporary credential.

The task descriptions and temporary credentials may be identified for processing the queried data before the queried data can be received from storage systems 120-122. These task descriptions may generated based on performance management restrictions that will be provided to the data configuration containing the queried data when it is generated and deployed within data access system 101, security and authorization restrictions that will be provided to the enforce user authorization and authentication when accessing the queried data from storage services 120-122, or based on caching restrictions. In particular, these tasks may provide operations to determine the IP addresses applicable to the queried data, the caching resources applicable to the queried data, the performance measurements applicable to the queried data, or any other similar requirements for the queried data.

Figure 4:
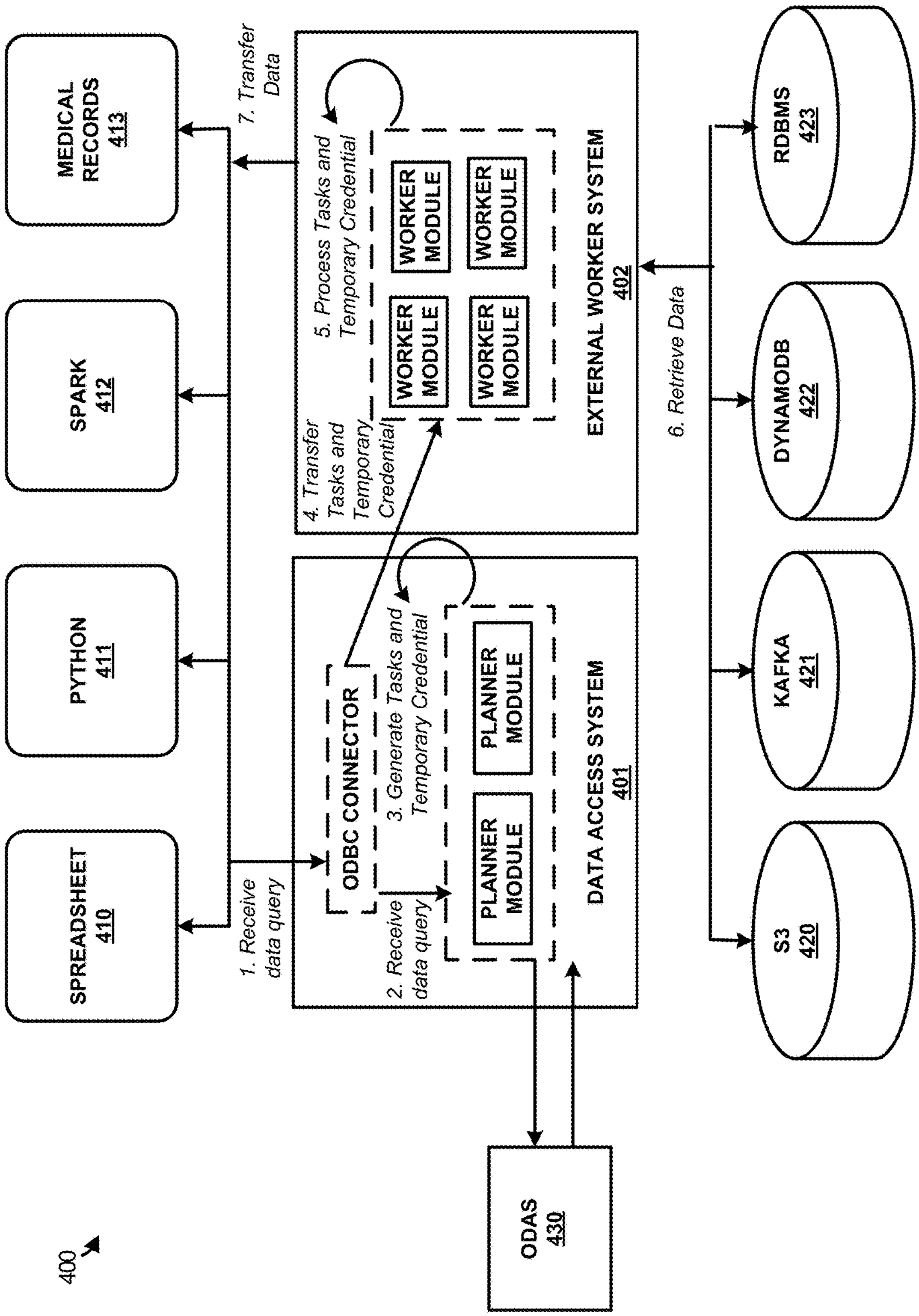
FIG. 4 illustrates a method of operating a data access service for generating a data configuration in a multiple application service and multiple storage service environment according to one implementation.

FIG. 4 illustrates an overview 400 of a data access system comprising an external server system to execute the worker modules according to one implementation. Overview 400 includes data access system 401, application services 410-413, storage services 420-423, and metadata service 430. Application services 410-413 include spreadsheet application 410, Python 411, Spark 412, and electronic medical record application 413. Storage services 420-423 include S3 420, Kafka 421, DynamoDB 422, and RDBMS 423. Data access system 401 includes communication interfaces, such as an ODBC connector, a planner comprising planner modules, and a worker comprising worker modules. As shown in FIG. 4, data access system 401 is capable of receiving data requests from various application services 410-413 and retrieve data from various storage services 420-423.

As described herein, at step 1, spreadsheet application 410 generates a request for data and transfers the request to data access system 401 in the ODBC connector. Next, at step 2, the data query is transferred from the ODBC connector to the planner within data access system 401. The planner controls authorization, performance management, and caching restrictions for data queries. In step 3, the planner generates a data retrieval instruction based on authorization policies. The data retrieval instruction comprises the task descriptions and a temporary credential. The temporary credential may indicate a scope of which data may be retrieved and a duration of time in which the data may be retrieved. In this example, the ODBC connector transfers the tasks and the temporary credential to the worker modules in the external worker system, as indicated by step 4. In response to receiving the data retrieval instruction, in step 5, the worker modules process the tasks and temporary credential and retrieve the data based on the tasks and temporary credentials, as shown in step 6. In a final step, the data is transferred to the spreadsheet application service 410.

Figure 5:
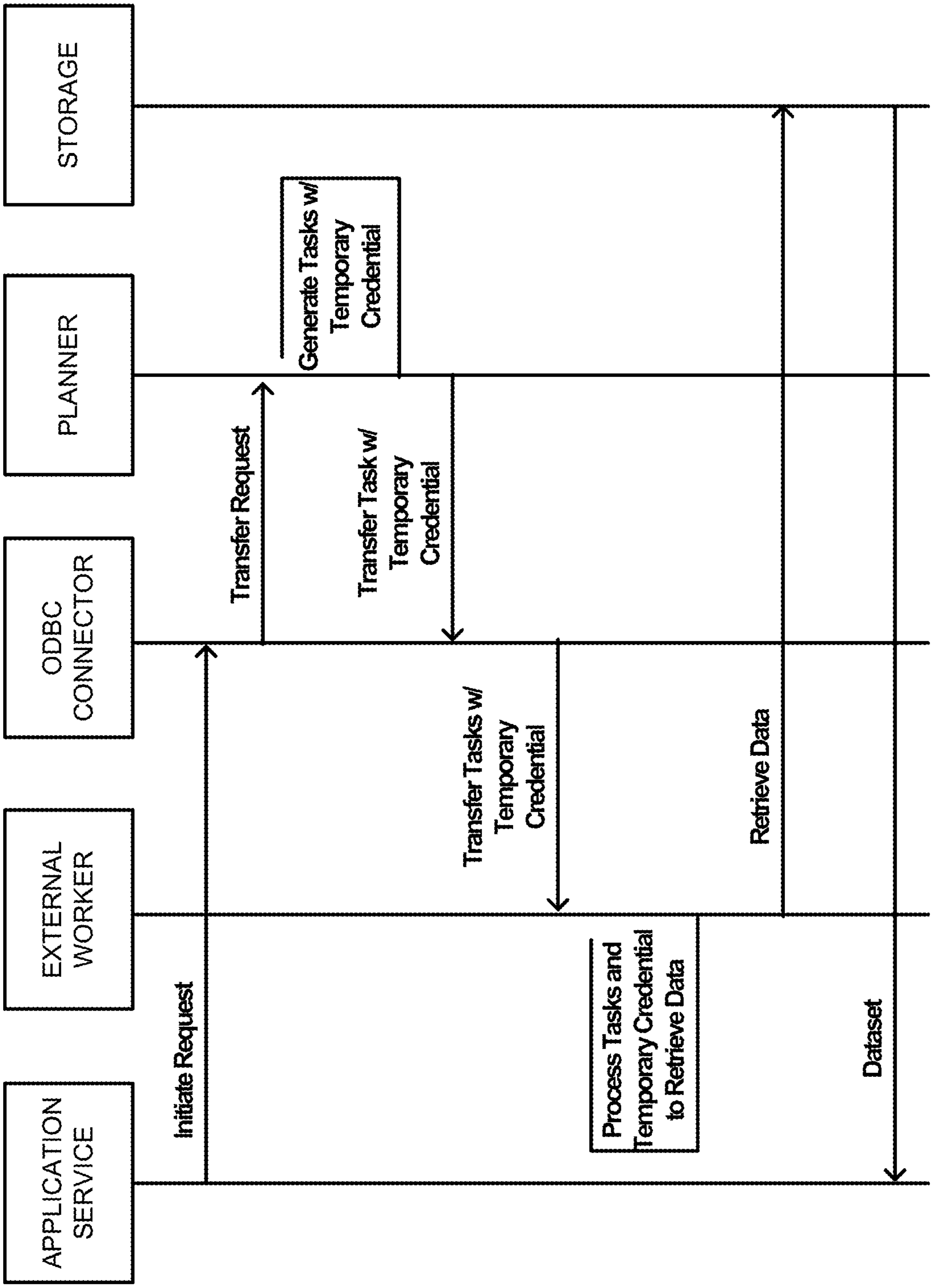
FIG. 5 illustrates an overview of generating a data table as a service in a multiple application service and multiple storage service according to one implementation.

To further demonstrate the operations of computing environment 400, FIG. 5 is provided. FIG. 5 illustrates a sequence diagram to implement data access system in a multiple application service and multiple storage service environment according to one implementation. The operations of FIG. 5 are described in the paragraphs that follow with reference to systems and objects of computing environment 400 from FIG. 4.

As illustrated in FIG. 5, the method begins with the ODBC connector in data access system 401 receiving a request from one of multiple application services 410-413. The ODBC connector transfers the request to the planner module which then generates a data retrieval instruction for the application services 410-413 to access the dataset from one or more of the multiple storage systems 420-423. The data retrieval instruction comprises task descriptions and a temporary credential. The data retrieval instruction is transferred from the ODBC connector to worker module 140 executing in the external worker system 402. The requested dataset is retrieved from multiple storage systems 420-423 and deployed to application services 410-413 based on the task descriptions and the temporary credential.

Figure 6:
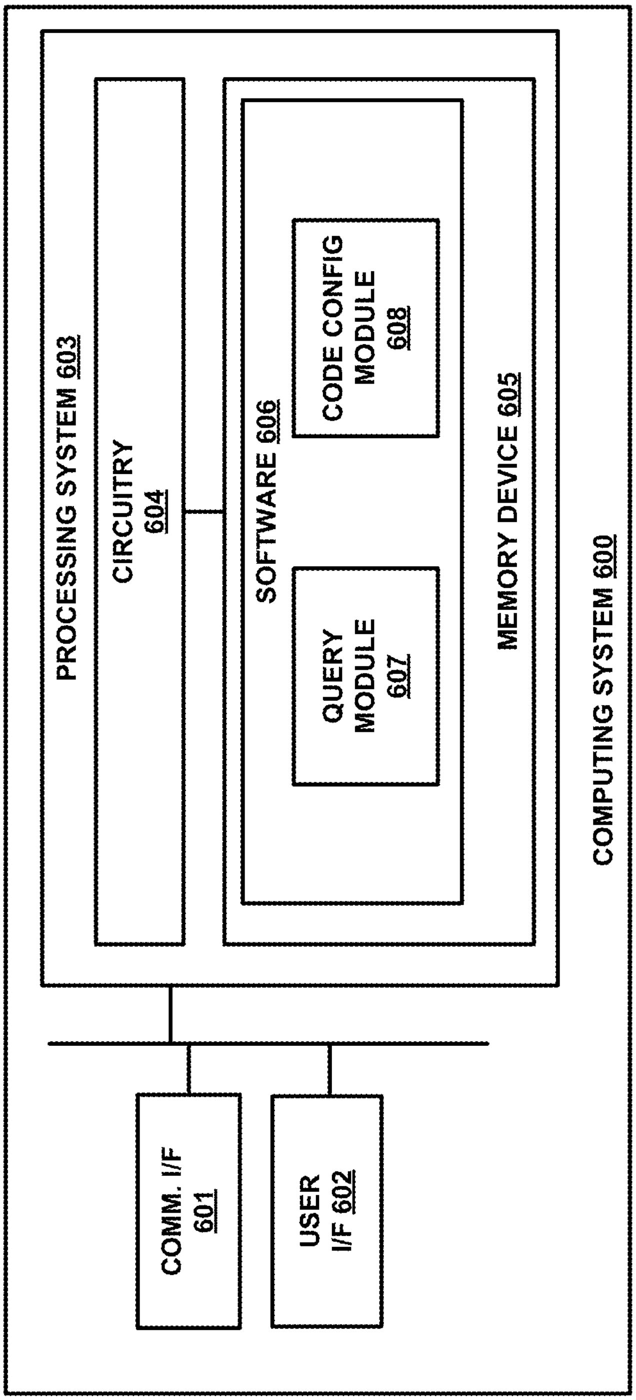
FIG. 6 illustrates a computing system to generate a data configuration in a multiple application service and multiple storage service according to one implementation.

FIG. 6 illustrates a computing system 600 to generate a data configuration in a multiple application service and storage service environment according to one implementation. Computing system 600 is representative of any computing system or systems with which the various operational architectures, processes, scenarios, and sequences disclosed herein for generating data configurations may be employed. Computing system 600 is an example of data access system 101 from FIG. 1 and data access system 401 from FIG. 5, although other examples may exist. Computing system 600 comprises communication interface 601, user interface 602, and processing system 603. Processing system 603 is linked to communication interface 601 and user interface 602. Processing system 603 includes processing circuitry 604 and memory device 605 that stores operating software 606. Computing system 600 may include other well-known components such as batteries and enclosures that are not shown for clarity. Computing system 600 may comprise one or more servers, personal computers, routers, or some other computing apparatus, including combinations thereof.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format-including combinations thereof.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus-including combinations thereof. User interface 602 may be omitted in some examples.

Processing circuitry 604 comprises microprocessor and other circuitry that retrieves and executes operating software 606 from memory device 605. Memory device 605 may include volatile and nonvolatile, removable and non-removable media implemented in any method or technology for storage of information, such as computer readable instructions, data configurations, program modules, or other data. Memory device 605 may be implemented as a single storage device, but may also be implemented across multiple storage devices or sub-systems. Memory device 605 may comprise additional elements, such as a controller to read operating software 606. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory.

Processing circuitry 604 is typically mounted on a circuit board that may also hold memory device 605 and portions of communication interface 601 and user interface 602. Operating software 606 comprises computer programs, firmware, or some other form of machine-readable program instructions. Operating software 606 includes query module 607, metadata 608, and data configuration module 609, although any number of software modules within the application may provide the same operation. Operating software 606 may further include an operating system, utilities, drivers, network interfaces, applications, or some other type of software. When executed by processing circuitry 604, operating software 606 directs processing system 603 to operate computing system 600 as described herein.

In at least one implementation, query module 607, when read and executed by processing system 603, directs processing system 603 to receive a data query from at least one of multiple application services, wherein the multiple application services may comprise a distributed application, an ODBC service, a REST service, and the like. In addition, query module 607 directs processing system 603 to retrieve the queried data from at least one of the multiple storage services. When read and executed by processing system 603, metadata module 608 directs processing system 603 to identify metadata that defines policies for processing the queried data in a large data processing environment. These policies may include performance management restrictions, security and authorization restrictions, caching restrictions, or any other similar policies indicating procedures for processing the queried data.

Once the policies have been identified by the metadata, data configuration module 609 directs processing system 603 to generate a data configuration containing the retrieved data based on standardized parameters and the policies defined by the metadata. In some implementations, the metadata provided may be generated in the form of one or more metadata files in a API format. Based on the metadata in the API format, data configuration module 609 may translate the one or more metadata files in the API format into the data configuration containing the retrieved data. After the data configurations are generated, data configuration module 609 further directs processing system 603 to deploy the data configuration to the at least one of the multiple application services.

In some implementations, computing system 600 may include a planner. In this implementation, metadata module 608 directs processing system 603 to query a metadata service for metadata defining the policies for processing the queried data. In other implementations, computing system 600 may include a worker. In this implementation, query module 607 directs processing system 603 to retrieve the queried data from the at least one of the multiple storage services.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:

receiving, at a data access system, a request from a client device to execute a query on data managed at a first storage system and a second storage system that is external from the first storage system, the first storage system and the second storage system being external to the data access system, the data access system maintaining a set of runtime operations for accessing and processing data within the first storage system and the second storage system;

generating, based on the set of runtime operations, a first set of data retrieval instructions for accessing and processing a first set of data at the first storage system and a second set of data retrieval instructions for accessing and processing a second set of data at the second storage system; and transmitting the first set of data retrieval instructions and the second set of data retrieval instructions to the client device, the client device transmitting the first set of data retrieval instructions to the first storage system to cause the first storage system to access and process the first set of data at the first storage system, and the client device transmitting the second set of data retrieval instructions to the second storage system to cause the second storage system to access and process the second set of data at the second storage system.

2. The method of claim 1, wherein the first storage system returns a first data result to the client device generated by processing the first set of data and the second storage system returns a second data result to the client device generated by processing the second set of data.

3. The method of claim 1, further comprising:

generating a first temporary credential providing limited access to the first set of data stored at the first storage system and a second temporary credential providing limited access to the second set of data stored at the second storage system, the first temporary credential being included in the first set of data retrieval instructions and the second temporary credential being included in the second set of data retrieval instructions.

4. The method of claim 3, wherein the first temporary credential indicates a limited data type from which data is accessible to the client device from the first storage system and the second temporary credential indicates a limited data type from which data is accessible to the client device from the second storage system.

5. The method of claim 3, wherein the first temporary credential indicates a limited duration of time during which data is accessible to the client device from the first storage system and the second temporary credential indicates a limited duration of time during which data is accessible to the client device from the second storage system.

6. The method of claim 1, wherein generating the first set of data retrieval instructions and the second set of data retrieval instructions comprises:

accessing a first set of security and authorization restrictions for the first storage system and a second set of security and authorization restrictions for the second storage system; and generating the first set of data retrieval instructions based on the first set of security and authorization restrictions and the second set of data retrieval instructions based on the second set of security and authorization restrictions.

7. The method of claim 1, further comprising:

authenticating the request based on authentication information for the first storage system and the second storage system, wherein generating the first set of data retrieval instructions and the second set of data retrieval instructions is performed in response to successfully authentication the request.

8. A data access system comprising:

one or more computer processors; and one or more computer readable mediums storing instructions that, when executed by the one or more computer processors, cause the data access system to perform operations comprising:

receiving a request from a client device to execute a query on data managed at a first storage system and a second storage system that is external from the first storage system, the first storage system and the second storage system being external to the data access system, the data access system maintaining a set of runtime operations for accessing and processing data within the first storage system and the second storage system;

generating, based on the set of runtime operations, a first set of data retrieval instructions for accessing and processing a first set of data at the first storage system and a second set of data retrieval instructions for accessing and processing a second set of data at the second storage system; and transmitting the first set of data retrieval instructions and the second set of data retrieval instructions to the client device, the client device transmitting the first set of data retrieval instructions to the first storage system to cause the first storage system to access and process the first set of data at the first storage system, and the client device transmitting the second set of data retrieval instructions to the second storage system to cause the second storage system to access and process the second set of data at the second storage system.

9. The data access system of claim 8, wherein the first storage system returns a first data result to the client device generated by processing the first set of data and the second storage system returns a second data result to the client device generated by processing the second set of data.

10. The data access system of claim 8, the operations further comprising:

generating a first temporary credential providing limited access to the first set of data stored at the first storage system and a second temporary credential providing limited access to the second set of data stored at the second storage system, the first temporary credential being included in the first set of data retrieval instructions and the second temporary credential being included in the second set of data retrieval instructions.

11. The data access system of claim 10, wherein the first temporary credential indicates a limited data type from which data is accessible to the client device from the first storage system and the second temporary credential indicates a limited data type from which data is accessible to the client device from the second storage system.

12. The data access system of claim 10, wherein the first temporary credential indicates a limited duration of time during which data is accessible to the client device from the first storage system and the second temporary credential indicates a limited duration of time during which data is accessible to the client device from the second storage system.

13. The data access system of claim 8, wherein generating the first set of data retrieval instructions and the second set of data retrieval instructions comprises:

accessing a first set of security and authorization restrictions for the first storage system and a second set of security and authorization restrictions for the second storage system; and generating the first set of data retrieval instructions based on the first set of security and authorization restrictions and the second set of data retrieval instructions based on the second set of security and authorization restrictions.

14. The data access system of claim 8, the operations further comprising:

authenticating the request based on authentication information for the first storage system and the second storage system, wherein generating the first set of data retrieval instructions and the second set of data retrieval instructions is performed in response to successfully authentication the request.

15. A non-transitory computer-readable medium storing instructions that, when executed by one or more computer processors of a data access system, cause the data access system to perform operations comprising:

receiving a request from a client device to execute a query on data managed at a first storage system and a second storage system that is external from the first storage system, the first storage system and the second storage system being external to the data access system, the data access system maintaining a set of runtime operations for accessing and processing data within the first storage system and the second storage system;

generating, based on the set of runtime operations, a first set of data retrieval instructions for accessing and processing a first set of data at the first storage system and a second set of data retrieval instructions for accessing and processing a second set of data at the second storage system; and transmitting the first set of data retrieval instructions and the second set of data retrieval instructions to the client device, the client device transmitting the first set of data retrieval instructions to the first storage system to cause the first storage system to access and process the first set of data at the first storage system, and the client device transmitting the second set of data retrieval instructions to the second storage system to cause the second storage system to access and process the second set of data at the second storage system.

16. The non-transitory computer-readable medium of claim 15, wherein the first storage system returns a first data result to the client device generated by processing the first set of data and the second storage system returns a second data result to the client device generated by processing the second set of data.

17. The non-transitory computer-readable medium of claim 15, the operations further comprising:

generating a first temporary credential providing limited access to the first set of data stored at the first storage system and a second temporary credential providing limited access to the second set of data stored at the second storage system, the first temporary credential being included in the first set of data retrieval instructions and the second temporary credential being included in the second set of data retrieval instructions.

18. The non-transitory computer-readable medium of claim 17, wherein the first temporary credential indicates a limited data type from which data is accessible to the client device from the first storage system and the second temporary credential indicates a limited data type from which data is accessible to the client device from the second storage system.

19. The non-transitory computer-readable medium of claim 17, wherein the first temporary credential indicates a limited duration of time during which data is accessible to the client device from the first storage system and the second temporary credential indicates a limited duration of time during which data is accessible to the client device from the second storage system.

20. The non-transitory computer-readable medium of claim 15, wherein generating the first set of data retrieval instructions and the second set of data retrieval instructions comprises:

accessing a first set of security and authorization restrictions for the first storage system and a second set of security and authorization restrictions for the second storage system; and generating the first set of data retrieval instructions based on the first set of security and authorization restrictions and the second set of data retrieval instructions based on the second set of security and authorization restrictions.

* * * * *